April 15, 1930.  P. D. CALLUM  1,754,543
KNIFE HANDLE
Filed Sept. 9, 1925  4 Sheets-Sheet 1
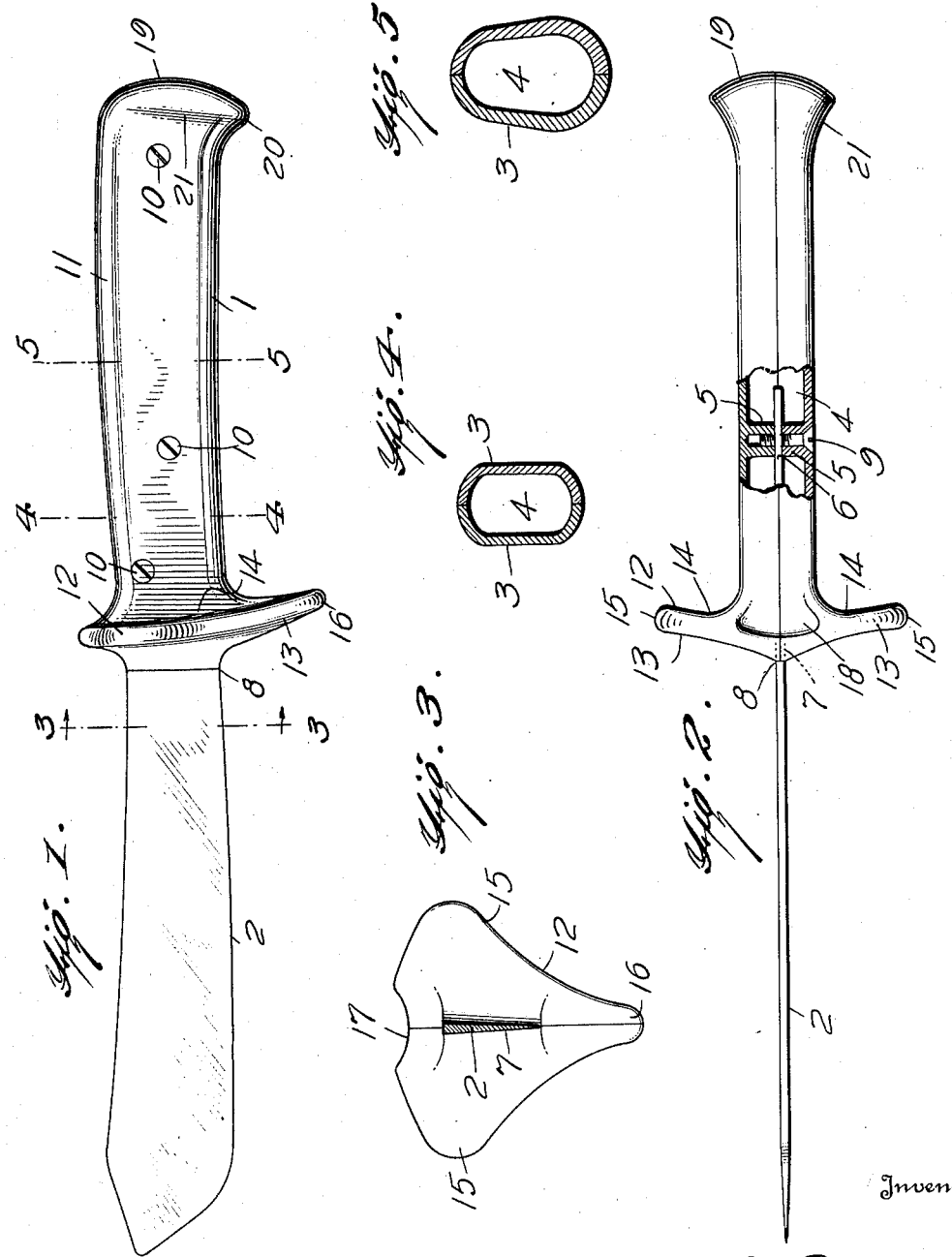
Inventor
PRESTON D. CALLUM,
By Semmes & Semmes
Attorneys

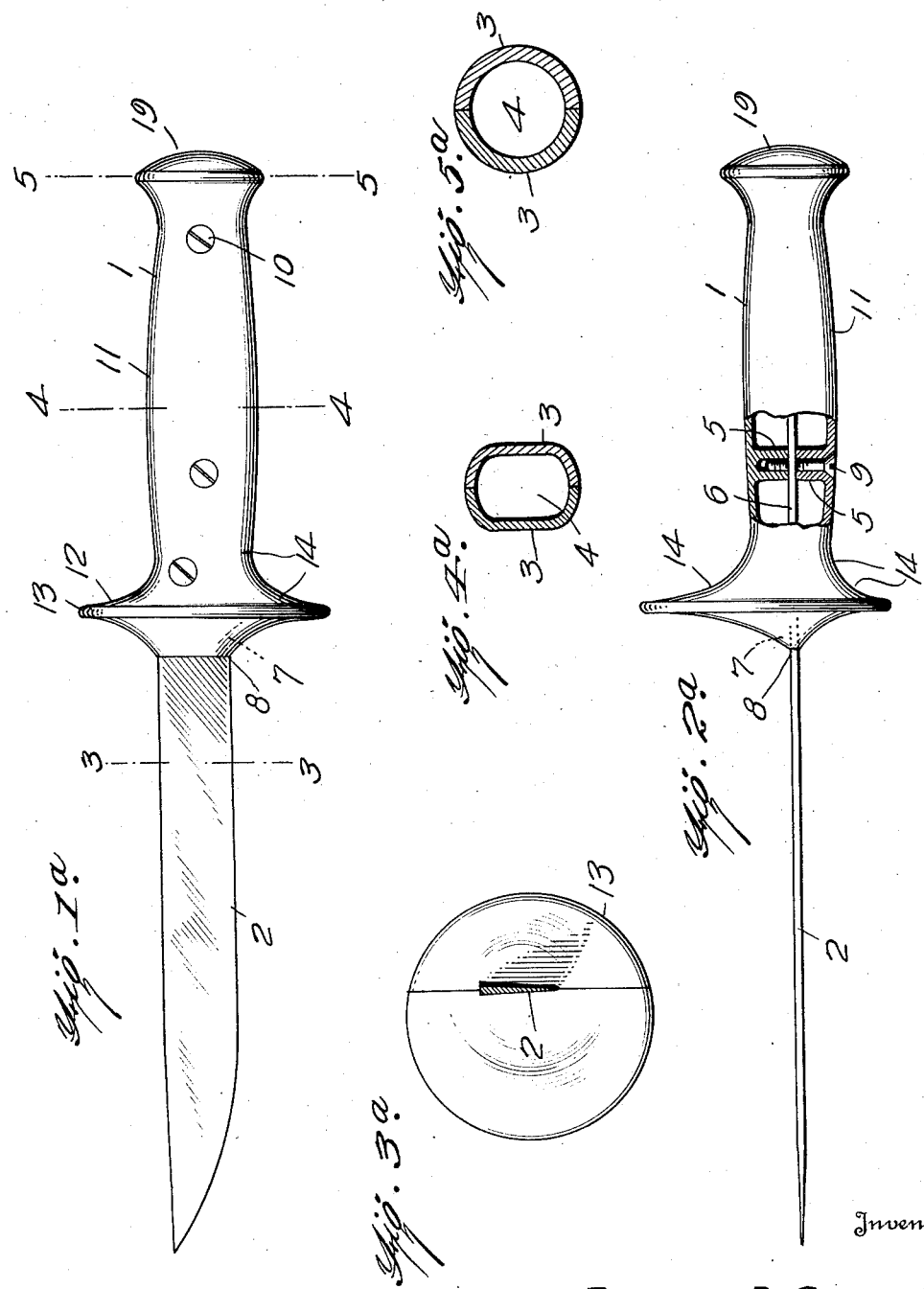

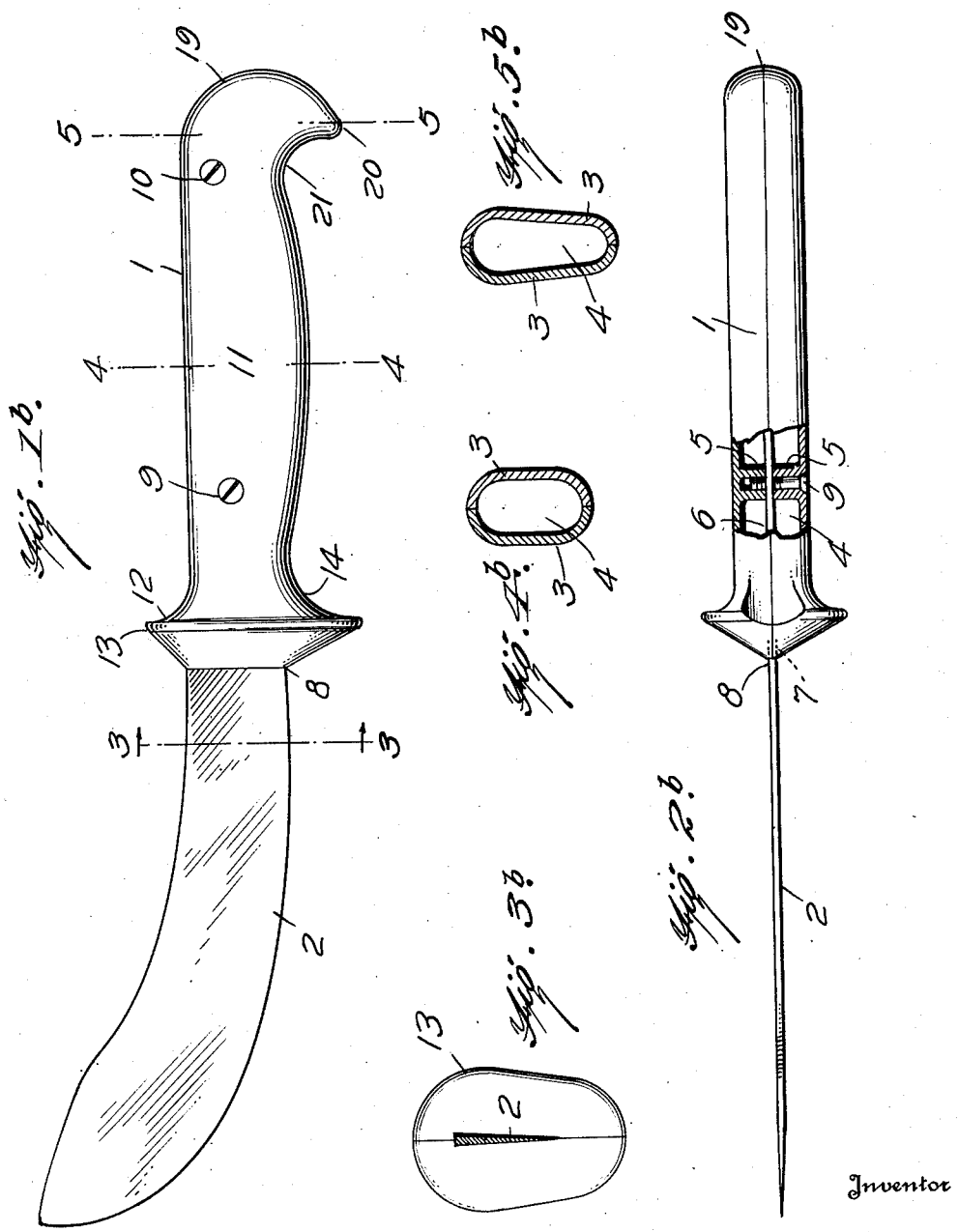

April 15, 1930.  P. D. CALLUM  1,754,543
KNIFE HANDLE
Filed Sept. 9, 1925    4 Sheets-Sheet 4
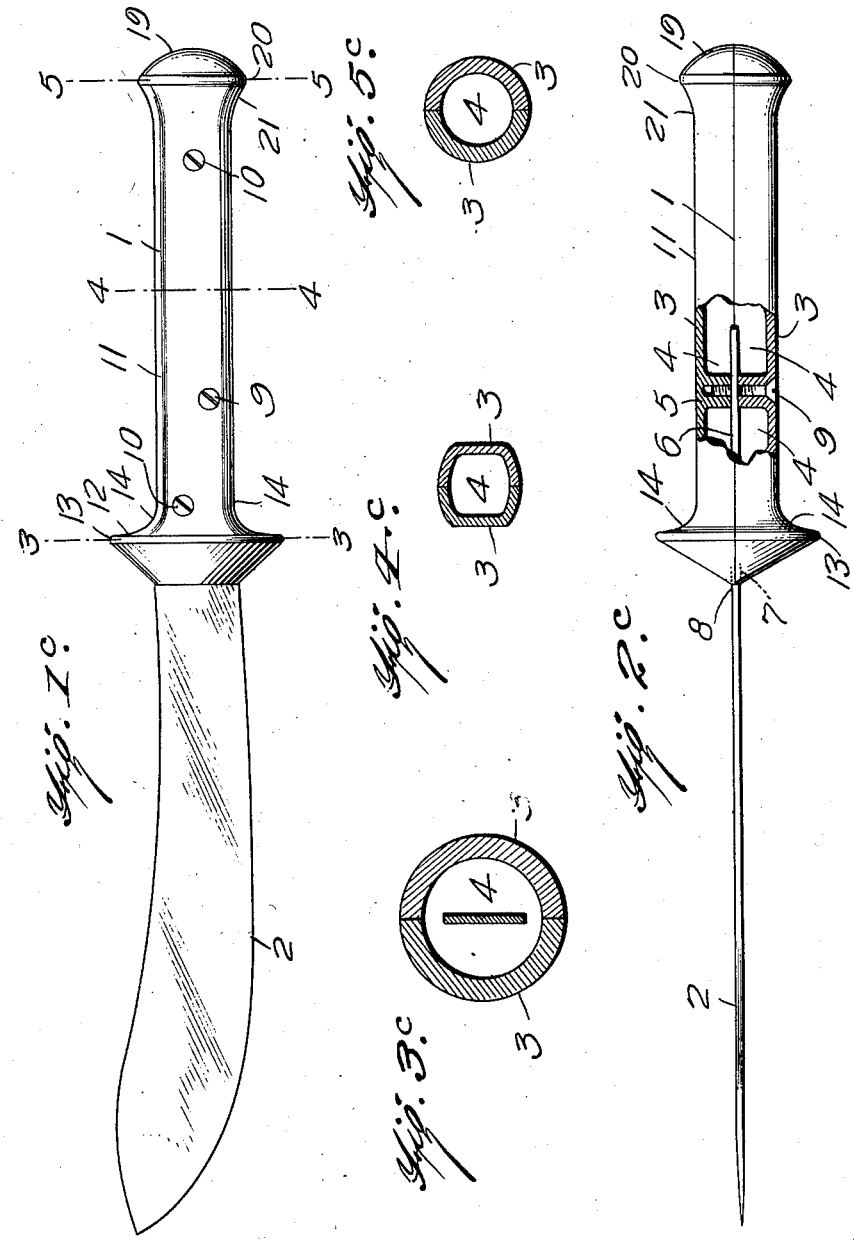
Inventor
PRESTON D. CALLUM,
By Semmes & Semmes
Attorneys.

Patented Apr. 15, 1930

1,754,543

UNITED STATES PATENT OFFICE

PRESTON D. CALLUM, OF BALTIMORE, MARYLAND

KNIFE HANDLE

Application filed September 9, 1925. Serial No. 55,211.

This invention relates to knives and more particularly to knife handles.

Heretofore knives used in various operations of the meat packing industry and particularly in butchering, the cutting of meat, and the removal of meaty substances from bone or carcass has been performed with knives of varying design equipped with an ordinary handle involving more or less exhaustion and fatigue to the operating arm, wrist and hand. The principal cause thereof is due to the firm, tight and continuous grip sustained for long periods. Such a grip is requisite for preventing axial rotation of the knife and the slipping of the operating hand from the handle to the blade.

A knife with an ordinary handle such as is generally used in the meat packing industry presents a difficult sanitary problem, due to accumulations of animal substance in the crevices and fissures incident to the construction thereof. However, the most serious objection to such knives as are usually and customarily used is the absolute lack of any protection whatsoever to the operating hand of an operator against injury sustained by the slipping of the hand from the handle to the blade. The slipping of the hand from the handle to the blade is caused by relaxing the grip resulting from strain and fatigue of the operating hand, also by the accumulation of fatty substance on the handle and operating hand.

An object of my invention is to provide a knife handle particularly constructed to relieve the fatigue element of the operator by reducing the necessity of a continuous tight grip upon the handle and to remove entirely any apprehension of injury by the slipping of the operating hand from the handle.

Another object of my invention is to provide a knife handle which may be easily and quickly adjusted to a blade and when once adjusted will owing to its particular construction be absolutely sanitary.

Another object of my invention is to provide a knife handle cast of a light alloy with internal ribs or pillows designed to strengthen the handle as a whole and to provide a support for a blade, and to so improve the general contour of the handle as to contribute greater ease, comfort, safety and efficiency in operation.

A further object of my invention is to provide a detachable handle of great durability and lasting utility, one which will permit the removal of broken or worn out blades and the insertion of new blades.

A still further object of my invention is to provide a handle which will be highly efficient in operation, and yet of marked simplicity as a whole, that its manufacture may be economically accomplished.

With these and other objects in view which may be incident to my improvements, the invention consists in the parts and combinations to be hereinafter set forth and claimed, with the understanding that the several necessary elements comprising my invention, may be varied in construction, proportions and arrangement, without departing from the spirit and scope of the appended claims.

In order to make my invention more clearly understood, I have shown in the accompanying drawings means for carrying the same into practical effect, without limiting the improvements in their useful applications to the particular constructions, which for the purpose of explanation, have been made the subject of illustration.

In the drawings forming a part of this specification:

Figure 1 is a side elevation of a butcher knife equipped with my improved handle, Figure 2 is a top plan view.

Figure 3 is a sectional view taken on line 3—3 Fig. 1 illustrating the guard,

Figure 4 is a sectional view taken on line 4—4 Fig. 1,

Figure 5 is a sectional view taken on line 5—5 Fig. 1,

Figure 1$^a$ is a side elevation of a boning knife equipped with a modified form of my improved handle, Figure 2$^a$ is a top plan view of the form illustrated in Fig. 1$^a$, Figure 3$^a$ is a sectional view taken on line 3—3 Fig. 1$^a$ displaying a front elevation of the guard, Figure 4ª is a sectional view taken on line 4—4 Fig. 1ª, Figure 5ª is a sectional view taken on line 5—5 Figure 1ª, Figure 1ᵇ is a side elevation of a hide skinning knife equipped with a modified form of my improved handle, Figure 2ᵇ is a top plan view of the modified form illustrated in Fig. 1ᵇ, Figure 3ᵇ is a sectional view taken on line 3—3 Fig. 1ᵇ illustrating the modified form of a shield, Figure 4ᵇ is a sectional view taken on line 4—4 Fig. 1ᵇ, Figure 5ᵇ is a sectional view taken on line 5—5 Fig. 1ᵇ, Figure 1ᶜ is a side elevation of a pork ribbing knife equipped with a modified form of my improved handle.

Figure 2ᶜ is a top plan view of the modified form shown in Fig. 1ᶜ,

Figure 3ᶜ is a sectional view taken on line 3—3 Fig. 1ᶜ,

Figure 4ᶜ is a sectional view taken on line 4—4 Figure 1ᶜ, and

Figure 5ᶜ is a sectional view taken on line 5—5.

Referring by numerals to the drawings 1 represents a knife handle in which is mounted a blade 2. The blades illustrated in the several views are the standard butcher, boning, hide skinning and pork ribbing knives, such as are in general use in the various operations of the meat packing industry.

The handle 1 comprises corresponding sides 3 cast of aluminum or any other light alloy. The grip portion of the handle is hollow as indicated at 4 and is provided with corresponding cross bars 5. The cross bars 5 perform a three fold function in that they impart strength to the metal, provide pillows upon which to bring together the sides 3 and a firm support for the shank 6 of the blade.

The forward ends of the sides 3 are provided with slots 7, which are the same width and half the thickness of the heel 8 of the blade, the object of which will hereinafter appear. Upon adjusting a blade within the handle, the shank 6 is clamped between the cross bars 5 with the heel 8 fitting perfectly between the slots 7. The blade is secured in this position by a screw 9 threaded in the crossbars and passing transversely through the shank. The screw 9 also serves to secure the corresponding sides together. The side pieces are further secured together by additional screws 10. the heads of the screws being counter-sunk as most clearly shown, so as to provide a smooth finish to the handle.

It is to be noted that the handle when assembled with a blade mounted therein is practically sealed. The joint or union between the two sides and the blade is so perfectly formed that any danger of accumulating animal substance in crevices and fissures incident to the structure is avoided, thus producing a sanitary handle.

The grip portion 11 of the handle is in the shape of a parabolic curve broader at the top than at the bottom. From its central portion the grip gently slopes toward the forward end of the handle and the butt. At the forward end of the handle there is formed a shield or guard 12. The guard 12 is a massed formation from the outer edge 13 of which there are gradual curvatures 14 merging in the curvatures of the grip. The curvatures 14 vary to a greater or less degree to meet the particular formation of the edge 13. The edge 13 is formed with corresponding and oppositely disposed wings 15 and a downwardly backwardly projecting lip 16.

The curvatures 14 are of such a character or formation as to produce a socket to fit as near as possible the socket formed between the thumb and forefinger of the operator's hand. The wings 15 and the lip 16 are designed to protect and prevent the fingers of the hand from passing from the handle to the blade.

In the top of the guard is a notch 17 in which is a depression 18 adapted for the reception of the thumb of the operator. The front face of the guard is curved from the edge 13 to the blade, in such a manner as to provide a juncture with the blade that will not interfere with the cutting process, and will enable all of the cutting edge to be used. This particular structure of the guard also produces great strength and durability to the handle.

The butt of the handle is enlarged as shown at 19 with a downwardly, inwardly projecting horn or lip 20 having graceful curves 21 merging into the curvature of the grip. The object of this structure is to prevent the handle from being driven or drawn forwardly through the hand. The curvatures of the butt and lip are so devised that in gripping the handle, if forward pressure be exerted to drive the handle through the hand, the conformation of the fingers will be such that only a moderate pressure is necessary to lock the little finger into the curved area. When this occurs, the greater the pressure exerted, the tighter the fingers will lock.

In Figure 1ª, 2ª, 3ª, 4ª, and 5ª, I have shown a modification of the handle wherein the guard 12 is produced in the form of a disk. A greater portion of the disk's surface is set to the right side and somewhat below the position of the handle. The edge 13 of the disk is rounded to meet the parabolic curves 14 merging with the curvature of the grip.

The grip 11 is modified to conform particularly with the guard and butt 19. The butt 19 is more in the form of a knob with inward curves merging with the curvature of the grip. The parabolic curves of the grip, the guard and the butt in this instance more naturally conform to the natural grip of the hand in the working position in which this type of knife is used, and the guard and butt is so formed as to prevent the operating hand from passing from the handle and becoming injured by contact with the blade.

It will of course be understood that the handle as here shown is for the use of one operating with the right hand, and that for a left hand operator the position of the shield would be the reverse. In either case the particular contour of the grip and its flaring guard and butt tends to compensate for the spread of the under edge of the operating hand. Such construction provides a firm base for the operating hand and greatly lessens the fatigue element of work, improves the comfort, and guards the hand from injury. This particular form of handle is adapted for use in connection with a boning knife.

In Figures 1$^b$, 2$^b$, 3$^b$, 4$^b$, and 5$^b$, I have shown a further modification. This particular style of knife is employed in the meat packing industry as a hide skinning knife. The grip 11 is so shaped that the top of the handle is broader than the bottom, and there is a very gentle parabolic curve from the top to the bottom. The grip is somewhat thicker at its central portion than at the respective ends of the handle. The curvatures from the central portions merging at the forward end in abrupt parabolic curves 14 designed to compensate for the varying length of the fingers of the operating hand and to improve the holding grip of the handle in regard to the special shape of the blade and the position of the hand, arm and body in working operations involving this type of knife. The abrupt parabolic curves 14 merge in the rounded edge 13 of the guard 12. The guard in this particular type is wider at the top than at the bottom both being circular and connected with straight line sides.

In the top of the guard in a line with the back of the handle is a curved portion 17 with a depression 18 for the reception of the operator's thumb. The depression 18 enables the thumb of the operator to rest immediately above and parallel to the top of the handle, thus increasing the comfort of handling as well as efficiency of operation, when working conditions make it necessary or desirable to assume this position.

The abrupt parabolic curves 14 above referred to prevent the hand from slipping from the handle to the blade. Should the hand come in contact with the curved area 14 with such exceptional force as to drive the hand from the handle, the hand would in passing over the curved area be forced wide open and injury thus prevented.

The but 19 of this handle is slightly modified from that shown in Figure 1 in that the downwardly inwardly projecting horn or hook 20 is somewhat exaggerated by the increased depth of the curve 21.

In Figures 1$^c$, 2$^c$, 3$^c$, 4$^c$, and 5$^c$, I have shown a still further modification. This type of knife is known to the trade as a pork ribbing knife. The grip 11 is symmetrical throughout its length with abrupt parabolic curves 14 at its forward end merging into the rounded edge 13 of the guard 12. The guard 12 in this particular form is circular. The guard 12 effectively prevents the hand from passing from the handle to the blade.

The butt 19 is in the form of a knob, such as is shown in Figure 1$^a$. From the outer edge 20 of the knob abrupt parabolic curves 21 merge with the plane of the grip.

This handle is of such contour that in gripping the same if forward pressure is exerted to drive the handle through the hand, the conformation of the fingers on the handle will be such that only a moderate pressure is necessary to lock the little finger into the curved area at the butt. When this occurs, the greater the pressure exerted, the tighter the fingers will lock.

It is to be noted that the length of the handle provided that in those operations requiring the use of both hands, the butt curves enables the fingers of the left hand to be locked on the butt thereby permitting greater pressure to be exerted to assist in the cutting operation.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention, or exceeding the scope of the appended claims.

Having thus described the various features of my invention what I claim as new and desire to secure by Letters Patent is:

1. A knife comprising a blade portion and a handle portion, said handle being formed of two symmetrical sections, each of said sections being of hollow cast construction and being provided with inwardly extending tubular projections adapted to engage a portion of the knife blade, and means extending through said projections and knife blade to retain the latter in fixed relation to said blade, a guard portion formed on the forward portion of each section, said guards being formed to extend in all directions from the assembled handle a distance sufficient to prevent the user's hand slipping onto the blade.

2. A knife comprising a blade portion and a handle portion, said handle being formed of two symmetrical sections, each of said sections being of hollow cast construction and being provided with inwardly extending tubular projections adapted to engage a portion of the knife blade and means extending through said bars and knife blade to retain the latter in fixed relation to said blade, a guard portion formed on the forward end of each section, each of said guard portions being provided with a notch upon its upper side, said guards being formed to extend in all directions from the assembled handle a distance sufficient to prevent the user's hand slipping onto the blade, and said notches adapted to form a recessed thumb rest for the user.

In testimony whereof I affix my signature.

PRESTON D. CALLUM.